United States Patent
Schulte

(10) Patent No.: US 12,038,076 B1
(45) Date of Patent: Jul. 16, 2024

(54) MULTI-FUNCTION DIFFERENTIAL ASSEMBLY

(71) Applicant: FCA US LLC, Auburn Hills, MI (US)

(72) Inventor: Michael Schulte, Sylvania, OH (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/309,343

(22) Filed: Apr. 28, 2023

(51) Int. Cl.
| | |
|---|---|
| *F16H 48/22* | (2006.01) |
| *F16H 48/08* | (2006.01) |
| *F16H 48/20* | (2012.01) |
| *F16H 48/28* | (2012.01) |
| *F16H 48/295* | (2012.01) |
| *F16H 48/34* | (2012.01) |

(52) U.S. Cl.
CPC ........... *F16H 48/22* (2013.01); *F16H 48/295* (2013.01); *F16H 48/08* (2013.01); *F16H 2048/204* (2013.01); *F16H 2048/282* (2013.01); *F16H 2048/343* (2013.01)

(58) Field of Classification Search
CPC .......... F16H 48/08–2048/343; F16D 2023/123
See application file for complete search history.

(56) References Cited

U.S. PATENT DOCUMENTS

| | | | | |
|---|---|---|---|---|
| 5,092,825 | A * | 3/1992 | Goscenski, Jr. | ........ F16H 48/08 475/231 |
| 6,296,590 | B1 * | 10/2001 | Gassmann | ......... B60K 23/0808 180/247 |
| 6,571,928 | B1 * | 6/2003 | Gassmann | ............. F16D 28/00 192/70.23 |
| 6,805,653 | B2 * | 10/2004 | Krzesicki | ................ F16H 48/34 475/233 |
| 7,264,568 | B2 * | 9/2007 | Ludwig | ................. F16H 48/295 475/233 |
| 9,382,991 | B2 * | 7/2016 | Drexler | .................... F16H 48/22 |
| 9,945,465 | B2 * | 4/2018 | Meixner | ................. F16H 48/08 |
| 11,254,207 | B2 * | 2/2022 | Edler | ..................... F16H 48/22 |

FOREIGN PATENT DOCUMENTS

FR 2929365 A1 * 10/2009 ............. F16H 48/08

* cited by examiner

*Primary Examiner* — Ernesto A Suarez
*Assistant Examiner* — James J Taylor, II
(74) *Attorney, Agent, or Firm* — Jeremy J. Klobucar

(57) ABSTRACT

A multi-function differential (MFD) assembly includes a differential case, a differential gear assembly disposed in the differential case, a mechanical limited slip differential (mLSD) clutch assembly disposed in the differential case, and an electronic limited slip differential (eLSD) clutch assembly disposed in the differential case. The mLSD clutch assembly is configured to provide the MFD assembly with mLSD functionality, and the eLSD clutch assembly is configured to provide the MFD assembly with eLSD functionality.

15 Claims, 4 Drawing Sheets

| Operating State | mLSD clutch | eLSD clutch | eLSD motor | Motor Controls | Driveline Controls |
|---|---|---|---|---|---|
| mLSD | TBR <= 2 multiplier | Open | Set fully open position (unloaded); motor brake not engaged | Motor not Controlled | Selects mLSD state for low speed based on steering angle predicted delta speed for city and parking lot |
| mLSD with preload | TBR <= 2 multiplier | Locked to desired preload (100Nm-2,000Nm typ.) | Set to fixed loaded position; motor brake engaged | Motor not Controlled | Selects mLSD with preload state based on 1) for racing, towing, and loaded vehicle operation |
| eLSD | TBR <= 2 multiplier | Varying locking torque (100-3,000Nm typ.) | Controlled to variable loaded positions; motor brake released | Highly dynamic motor controls | Selects eLSD state based on higher speed, higher engine torque, and lower steering angle for racing, towing, and loaded vehicle operation |
| Locker | TBR <= 2 multiplier (2 x 3,000Nm) | Locked to max preload (3,000Nm) | Set to max. fixed loaded position; motor brake engaged | Motor not controlled | Selects locker state upon driver request (button / knob) |

FIG. 3

| Primary Mode | Event | Key Functional Objective | Open | mLSD | mLSD Preload | eLSD | Locker |
|---|---|---|---|---|---|---|---|
| High Speed | Racing, Freeway | Mixed μ traction, vehicle dynamics & stability | 0 | 0 | X | XXX | N/A* |
| Low Speed | offroad | Low μ traction, max. propulsion torque | 0 | 0 | X | X | XXX |
| Low Speed | City, Parking Lot | High μ traction, no Noise-Vibration - Harshness | XXX | X | 0 | X | N/A* |
| High Torque | Racing, Towing @ hill | High μ traction, max propulsion torque | 0 | XXX | XXX | XX | N/A* |
| Medium Torque | Towing, Loaded vehicle | High μ traction, vehicle stability (no delta speed) | 0 | XXX | XXX | XX | N/A* |
| Low Torque | Winter, slippery road | Low μ traction, vehicle stability (no delta speed) | 0 | 0 | X | XXX | N/A* |

* Locker acts as open differential for these operating conditions

FIG. 4

MULTI-FUNCTION DIFFERENTIAL ASSEMBLY

FIELD

The present application relates generally to vehicle differentials and, more particularly, to a multi-function differential assembly with mechanical and high torque electronic wheel slip control.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to potentially lose traction, for example, in snow or mud or other slick mediums. If either of the drive wheels loses traction, it will spin at a high rate of speed and the other wheel may not spin at all. To overcome this situation, various types of differentials have been developed. For example, limited slip differentials were developed to shift power from the drive wheel that has lost traction and is spinning to the drive wheel that is not spinning. However, each of the various types of differentials have potential limitations and require separate components and system designs, analysis, development, and validation for each specific vehicle. Accordingly, while such systems do work well for their intended purpose, there is a desire for improvement in the relevant art.

SUMMARY

In accordance with one example aspect of the invention, a multi-function differential (MFD) assembly is provided. In one example, the MFD assembly includes a differential case, a differential gear assembly disposed in the differential case, a mechanical limited slip differential (mLSD) clutch assembly disposed in the differential case, and an electronic limited slip differential (eLSD) clutch assembly disposed in the differential case. The mLSD clutch assembly is configured to provide the MFD assembly with mLSD functionality, and the eLSD clutch assembly is configured to provide the MFD assembly with eLSD functionality.

In addition to the foregoing, the described MFD assembly may include one or more of the following features: wherein the MFD assembly functions as an open differential when the eLSD clutch assembly is disengaged, wherein the mLSD clutch assembly is passive and functions as a torque multiplier, wherein actuating the eLSD clutch assembly is configured to add a preload to the mLSD, which torque multiplies the preload, and wherein when the eLSD is actuated to provide a predetermined amount of torque, the mLSD clutch assembly and the eLSD clutch assembly generate a locker-equivalent locking torque such that the MFD assembly functions as a locking differential.

In addition to the foregoing, the described MFD assembly may include one or more of the following features: wherein the MFD assembly is configured to operate in the following modes: (i) an 'mLSD' mode where the eLSD clutch assembly is not actuated and the MFD assembly operates as a differential with torque sensing mLSD; (ii) an 'mLSD with preload' mode where the eLSD clutch assembly is actuated to provide a fixed amount of torque to the mLSD clutch assembly, which fixed torque is subsequently torque multiplied by the mLSD clutch; (iii) an 'eLSD Variable' mode where the eLSD clutch assembly is actuated and modulated to provide a variable amount of torque to the mLSD clutch assembly, which variable torque is subsequently torque multiplied by the mLSD clutch; and (iv) an 'eLSD Lock' mode where the eLSD clutch assembly is actuated to a maximum torque such that the mLSD clutch assembly and the eLSD clutch assembly together generate a predetermined holding torque that enables the MFD assembly to function as a locking differential.

In addition to the foregoing, the described MFD assembly may include one or more of the following features: wherein the mLSD clutch assembly is located on a first side of the differential housing and operably associated with a first side gear of the differential gear assembly, and wherein the eLSD clutch assembly is located on a second side of the differential housing opposite the first side, and the eLSD clutch assembly is operably associated with a second side gear of the differential gear assembly; wherein the mLSD clutch assembly is freewheeling and not preloaded; wherein the mLSD clutch assembly includes an mLSD clutch pack including a set of first clutch plates coupled to the differential case, and a set of second clutch plates interleaved with the first clutch plates and coupled to a side gear of the differential gear assembly.

In addition to the foregoing, the described MFD assembly may include one or more of the following features: wherein the eLSD clutch assembly includes an eLSD clutch pack, a ball ramp assembly, and an actuator assembly configured to actuate the ball ramp assembly to thereby actuate the eLSD clutch pack; wherein the eLSD clutch pack includes a set of first clutch plates coupled to the differential case, and a set of second clutch plates interleaved with the first clutch plates and coupled to a side gear of the differential gear assembly; wherein the ball ramp assembly includes a ball ramp mechanism including a plurality of cams disposed between an outboard ramped plate and an inboard ramped plate, and a plurality of pins operably coupled to the inboard ramped plate to selectively engage and actuate the eLSD clutch pack; and wherein the actuator assembly includes a motor with a rotatable output shaft, a reduction gear set operably coupled between the motor output shaft and the ball ramp assembly, and a brake configured to selectively brake the motor.

In addition to the foregoing, the described MFD assembly may include one or more of the following features: wherein the mLSD clutch assembly is configured to multiply torque by a factor of at least two; wherein the eLSD clutch assembly is configured to be modulated to generate a torque between 0 Nm and 1,500 Nm; and wherein the eLSD clutch assembly is configured to be actuated to a maximum torque of at least 3,000 Nm, which is torque multiplied by the mLSD clutch assembly to generate at least 6,000 Nm of holding torque to enable the MFD assembly to function as a locked differential.

In addition to the foregoing, the described MFD assembly may include one or more of the following features: wherein the differential case defines first and second output shaft openings that are co-axially aligned along an axis of rotation of the differential case; wherein the differential gear assembly includes a first and a second side gear rotatably mounted within the differential case, the first and second side gears being co-axially aligned along the axis of rotation of the differential case, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening; and wherein the differential gear assembly further includes a plurality of pinion gears disposed between the first and second side gears and rotatably mounted to a pinion gear shaft that is fixed for rotation with the differential case.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a table illustrating example operating states of the MFD assembly of FIG. 1, in accordance with the principles of the present application; and FIG. 4 is a table illustrating example performance capability of the MFD assembly of FIG. 1, in accordance with the principles of the present application.

DETAILED DESCRIPTION

According to the principles of the present application, systems and methods are described for a multi-function differential (MFD) assembly with mechanical as well as high torque electronic wheel slip control for improved on-road and off-road performance and capability. The MFD assembly includes a driveline (axle, RDM, EDM gearbox, etc.) differential with mechanical limited slip (mLS) clutch plates on one or both sides of the differential, and an electronically controlled limited slip (eLS) mechanism with clutch plates on the other side of the differential or as a separate eLS mechanism mounted to the differential. The eLS mechanism may be actuated electro-mechanically (e.g., motorized ball ramp mechanism) or servo-hydraulically (e.g., piston with e-pump).

Unlike typical vehicles that only have one type of differential system, the MFD assembly described herein selectively provides all of the function and benefits of mechanical limited slip differentials (mLSD), electronic limited slip differentials (eLSD), and locking differentials, thus providing functionality of all differential types to a user while reducing engineering efforts and increasing manufacturing volumes with less differential options. In one example, the MFD assembly achieves locking torque of >6,000 Nm and provides superior vehicle capability performance, including: vehicle handling and dynamics attributes; vehicle acceleration attributes; vehicle traction attributes; vehicle stability attributes, including for towing; vehicle off-road capability attributes (e.g., trail rating); and vehicle usage attributes (e.g., payload, pulling).

In this way, the MFD assembly integrates mechanical limited slip clutch plates (passive) with electronically controlled clutch plates (active) to provide the characteristics of mLSD, eLSD, and when combined, the ability to reach locking torques usually only achievable with a locking differential. Limited slip functionality (mechanical or electronically controlled) and high locking torque functionality comparable to a true locker can be realized through the corresponding actuation of the eLSD function. As such, the MFD assembly provides four settings or modes capable of providing various differential-type functions, including: (i) an 'mLSD' mode; (ii) an 'mLSD with preload' mode; and (iii) an 'eLSD Variable' mode; and (iv) an 'eLSD Lock' mode, as will be described herein in more detail.

Figure 1:
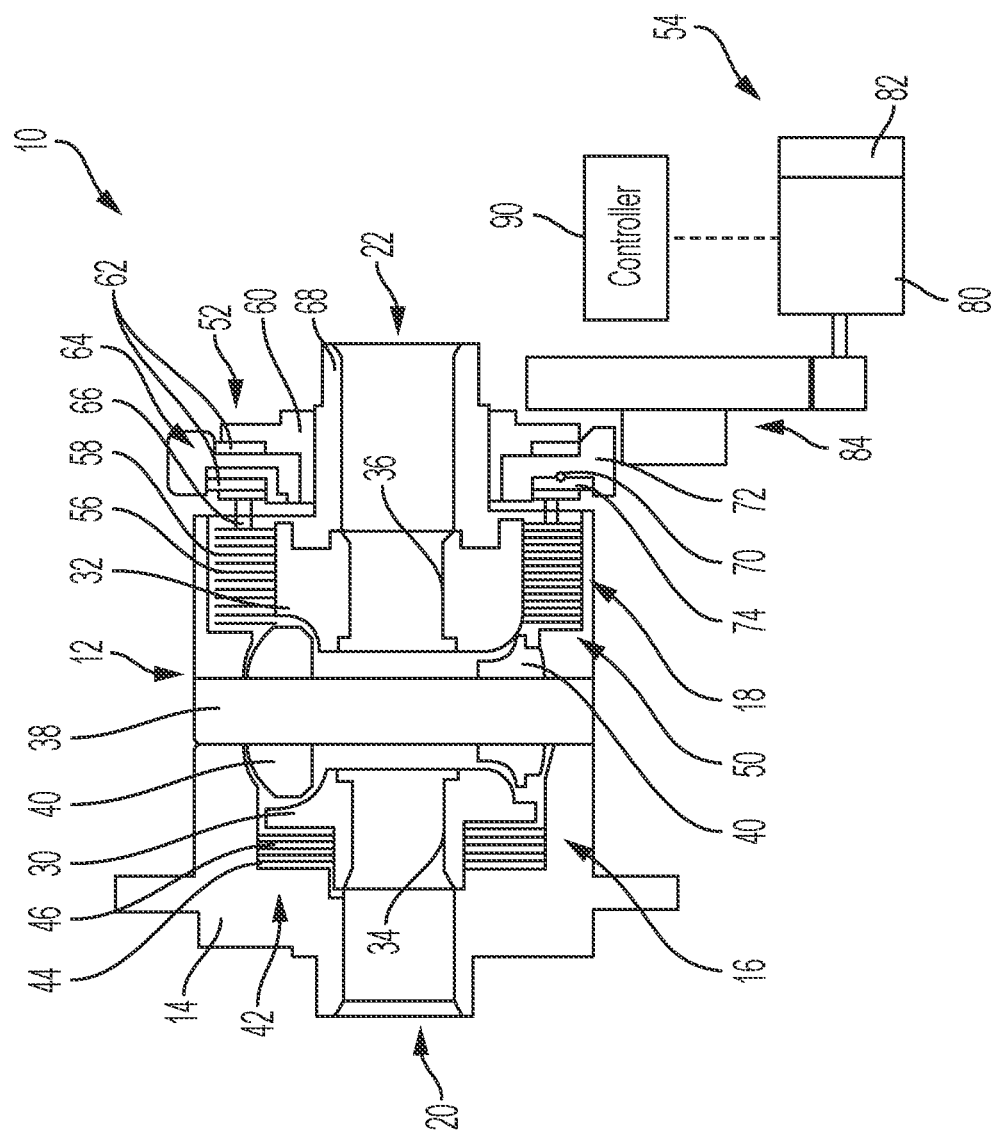
FIG. 1 is a cross-sectional view of an example multi-function differential (MFD) assembly in accordance with the principles of the present application.

With initial reference to FIG. 1, a multi-function differential (MFD) assembly 10 is illustrated in accordance with the principles of the present disclosure. In the example embodiment, the MFD assembly 10 generally includes a differential gear assembly or mechanism 12 arranged in a differential case 14, an mLSD clutch assembly 16, and an eLSD clutch assembly 18. The MFD assembly 10 is configured to be received within an axle assembly housing (not shown) and operates to drive a pair of axle shafts (not shown) received through axle shaft openings 20, 22 and connected to drive wheels (not shown). In general, the MFD assembly 10 functions as a traditional open differential during normal operating conditions until an event occurs where an increased torque bias is desired. For example, when a loss in traction is detected or anticipated, the eLSD clutch assembly 18 can be selectively actuated in order to generate the optimum bias ratio for the situation.

With continued reference to FIG. 1, the differential gear assembly 12 generally includes a pair of side gears 30, 32 that are mounted for rotation with the axle shafts and first and second drive wheels. The side gears 30, 32 define first and second axle openings 34, 36 with internal splines (not shown) for splined engagement with mating external splines of the axle shafts. A cross pin or pinion gear shaft 38 is fixedly mounted to the differential case 14 for rotation therewith. A corresponding set of pinion gears 40 are mounted for rotation with the pinion gear shaft 38 and are in meshing engagement with the side gears 30, 32. In the open configuration, the differential gear assembly 12 acts to allow the axle shafts to rotate at different speeds.

The mLSD clutch assembly 16 is configured to provide mechanical limited slip functionality to the MFD assembly 10. In the example embodiment, the mLSD clutch assembly 16 generally includes a clutch pack 42 having a set of first annular clutch plates 44 and a set of second of annular clutch plates 46. The first annular clutch plates 44 are in splined engagement with the differential case 14 and interleaved with the second annular clutch plates 46, which are in splined engagement with the side gear 30. In the example implementation, the mLSD clutch pack 42 is not pre-loaded and is thus free-wheeling.

The eLSD clutch assembly 18 is configured to provide an electronic limited slip functionality to the MFD assembly 10, which at the same time provides an electronically controlled pre-load or load to the mLSD clutch plates 44, 46 as it generates a base locking torque against which the mLSD is reacting. In the example embodiment, the eLSD clutch assembly 18 generally includes a clutch pack 50, a ball ramp assembly 52, and an actuator assembly 54.

The eLSD clutch pack 50 includes a set of first annular clutch plates 56 and a set of second annular clutch plates 58. The first annular clutch plates 56 are in splined engagement with the differential case 14 and interleaved with the second annular clutch plates 58, which are in splined engagement with the side gear 32. In the example embodiment, the eLSD clutch pack 50 is freewheeling until the actuator starts begins engaging the clutch packs.

In the example embodiment, the ball ramp assembly 52 generally includes a snap ring 60, axial bearings 62, a ball ramp mechanism 64, and pressure pins/springs 66. The snap ring 60 is configured to hold the ball ramp assembly 52 together against a differential cover 68, which is removably coupled to the differential case 14. The axial bearings 62 are configured to provide support to the ball ramp assembly 52 while minimizing friction and drag torque during vehicle speed. The ball ramp mechanism 64 includes a plurality of balls 70 disposed between an outboard ramped plate 72 and an inboard ramped plate 74. The pressure pins/springs 66 are operably coupled to the inboard ramped plate 74 and are configured to extend through the differential cover 68 and selectively actuate the eLSD clutch pack 50 upon actuation of the ball ramp assembly 52. When the ball ramp assembly 52 is not energized, the pressure pins/springs 66 are biased away from the eLSD clutch pack 50 (i.e., clutch plates are not engaged).

In the example implementation, the actuator assembly 54 generally includes an actuator 80 (e.g., motor), a brake 82, and a reduction gear set 84. The actuator 80 is configured to selectively rotate an output shaft 86, which is meshing engagement with the reduction gear set 84 for rotation thereof. The reduction gear set 84 is also in meshing engagement with the outboard ramped plate 72 for rotation thereof. The brake 82 is configured to brake the actuator 80. In general, actuator 80 is configured to actuate the ball ramp assembly 52 to thereby actuate (engage) the eLSD clutch pack 50 in a well-known manner. However, although eLSD clutch pack 50 is described as electro-mechanically actuated, it will be appreciated that eLSD clutch pack 50 may be actuated in any suitable manner that enables MFD assembly 10 to function as described herein. For example, eLSD clutch pack 50 may be actuated hydraulically, pneumatically, electromagnetically, etc.

Figure 2:
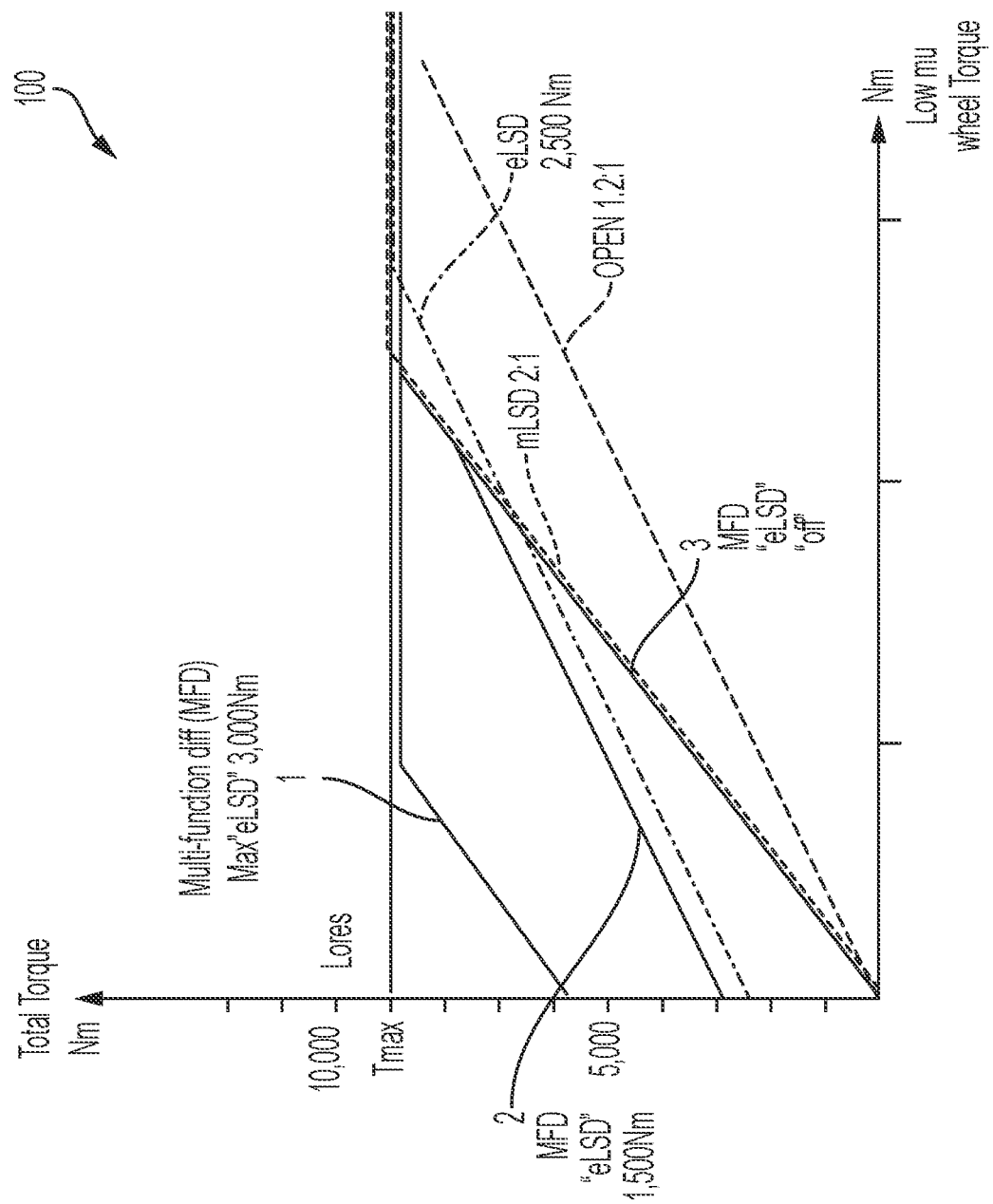
FIG. 2 is a graph plotting a total torque and a low friction wheel torque and illustrating example operational capability and performance of the MFD assembly of FIG. 1 in various modes for example clutch torque capacities, in accordance with the principles of the present application.

With additional reference now to FIGS. 2-4, operation of the MFD assembly 10 will be described in more detail. As previously described, MFD assembly 10 is configured to selectively operate in the 'mLSD' mode, the 'mLSD with preload' mode, the 'eLSD Variable' mode, and the 'eLSD Lock' mode to provide various differential functions and capability. FIG. 2 illustrates a graph 100 of an example operational capability and performance of the MFD assembly 10 in the various modes. FIG. 3 is a table 200 illustrating example operating states (mLSD, mLSD with preload, eLSD, and locker) of the MFD assembly 10. FIG. 4 is a table 300 illustrating example performance capability for the MFD assembly 10 in various primary driving modes, example driving events, as well as key functional objectives for the primary modes and events. Performance is shown from '0' (low performance) to 'XXX' (high performance). The MFD assembly 10 is capable of achieving high performance 'XXX' for all Primary Modes to meet the Key Functional Objectives.

Example operation of the MFD assembly 10.

In the base 'mLSD' mode, the eLSD clutch assembly 18 is not actuated. As such, the mLSD clutch plates 44, 46 are not compressed and the MFD assembly 10 operates as an open differential with passive mLSD. As torque is passed through the MFD assembly 10, the side gears 30, 32 automatically begin to separate from each other, thereby compressing the mLSD clutch pack 42 and providing the mLSD functionality. In this way, the mLSD function is always active as soon as a predefined amount of torque is passed through the MFD assembly 10. In one example, the mLSD clutch plates 44, 46 have a hard coded torque bias ratio (e.g., between 2 and 3), thereby providing a torque multiplying feature.

In the 'mLSD with preload' mode, the eLSD is set to a predefined constant locking torque by a button and/or controller 90 (FIG. 1). The eLSD function is configured to control actuator assembly 54 to engage the eLSD clutch pack 50 via the ball ramp assembly 52, which functions as a preload added to the mLSD clutch pack 42, thereby adding to the torque multiplication the mLSD clutch assembly 16 already provides.

In the 'eLSD Variable' mode, the eLSD function is activated either manually or automatically, for example, via button and/or controller 90 (FIG. 1). The eLSD function automatically controls actuator assembly 54 to engage the eLSD clutch pack 50 via the ball ramp assembly 52, which functions as a preload added to the mLSD clutch pack 42. In this way, the eLSD clutch pack 50 is selectively modulated with actuator assembly 52 to generate variable amounts of torque (e.g., 0-1,500 Nm), which adds to the torque multiplication the mLSD clutch assembly 16 already provides.

In the 'eLSD Lock' mode, the eLSD clutch pack 50 is actuated to a max torque that effectively provides a locker-equivalent locking torque (e.g., >6,000 Nm). Normally, a conventional eLSD just adds a fixed amount of torque to the differential. However, with MFD assembly 10, the mLSD clutch assembly 16 becomes a torque multiplier. For example, if the eLSD has a 0-3,000 Nm capacity and the mLSD provides a torque multiplication factor of 2.0, the MFD assembly 10 is capable of generating 6,000 Nm of holding torque between the two clutch packs 42, 50 such that it effectively functions as a locking differential. However, it will be appreciated the torque multiplication factor is variable and dependent, for example, upon the number/design of clutch plates utilized. Accordingly, the MFD assembly 10 is configured to provide open differential, mLSD, mLSD with preload, eLSD, and locking differential capability.

Described herein are systems and methods for a multi-function differential (MFD) assembly configured to provide open differential, mLSD, mLSD with preload, eLSD, and locking differential capability in a single differential unit. The MFD assembly includes a torque multiplying mLSD feature, which can be used in tandem with a variably modulated eLSD feature to selectively provide locker-equivalent locking torque. In this way, the MFD assembly can provide superior vehicle performance during a multitude of driving modes that is not possible with conventional differentials. Moreover, the single MFD unit advantageously eliminates product complexity by combining mLSD, eLSD, and locker functionality into a single differential assembly. The MFD assembly further increases vehicle performance and capability by offering both mechanical and electronic wheel slip control with seamless integration of passive mLSD, active eLSD, and locking differential functionality in a single differential, thereby eliminating the need to choose only one option and compromise vehicle capability.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A multi-function differential (MFD) assembly, comprising:
    a differential case;
    a differential gear assembly disposed in the differential case;
    a mechanical limited slip differential (mLSD) clutch assembly disposed in the differential case; and
    an electronic limited slip differential (eLSD) clutch assembly disposed in the differential case,
    wherein the mLSD clutch assembly is configured to provide the MFD assembly with mLSD functionality, and the eLSD clutch assembly is configured to provide the MFD assembly with eLSD functionality, and
    wherein the MFD assembly is configured to operate in the following modes:
        (i) an 'mLSD' mode where the eLSD clutch assembly is not actuated and the MFD assembly operates as a differential with torque sensing mLSD;
        (ii) an 'mLSD with preload' mode where the eLSD clutch assembly is actuated to provide a fixed amount of torque to the mLSD clutch assembly, which fixed torque is subsequently torque multiplied by the mLSD clutch assembly;
        (iii) an 'eLSD Variable' mode where the eLSD clutch assembly is actuated and modulated to provide a variable amount of torque to the mLSD clutch assembly, which variable torque is subsequently torque multiplied by the mLSD clutch assembly; and
        (iii) an 'eLSD Lock' mode where the eLSD clutch assembly is actuated to a maximum torque such that the mLSD clutch assembly and the eLSD clutch assembly together generate a predetermined holding torque that enables the MFD assembly to function as a locking differential.

2. The MFD assembly of claim 1,
    wherein the MFD assembly functions as an open differential when the eLSD clutch assembly is disengaged,
    wherein the mLSD clutch assembly is passive and functions as a torque multiplier, and
    wherein actuating the eLSD clutch assembly is configured to add a preload to the mLSD, which torque multiplies the preload.

3. The MFD assembly of claim 1, wherein the mLSD clutch assembly is located on a first side of the differential case and operably associated with a first side gear of the differential gear assembly, and
    wherein the eLSD clutch assembly is located on a second side of the differential case opposite the first side, and the eLSD clutch assembly is operably associated with a second side gear of the differential gear assembly.

4. The MFD assembly of claim 1, wherein the mLSD clutch assembly is freewheeling and not preloaded.

5. The MFD assembly of claim 1, wherein the mLSD clutch assembly includes an mLSD clutch pack comprising:
    a set of first clutch plates coupled to the differential case; and
    a set of second clutch plates interleaved with the first clutch plates and coupled to a side gear of the differential gear assembly.

6. The MFD assembly of claim 1, wherein the eLSD clutch assembly comprises:
    an eLSD clutch pack;
    a ball ramp assembly; and
    an actuator assembly configured to actuate the ball ramp assembly to thereby actuate the eLSD clutch pack.

7. The MFD assembly of claim 6, wherein the eLSD clutch pack comprises:
    a set of first clutch plates coupled to the differential case; and
    a set of second clutch plates interleaved with the first clutch plates and coupled to a side gear of the differential gear assembly.

8. The MFD assembly of claim 6, wherein the ball ramp assembly comprises:
    a ball ramp mechanism including a plurality of cams disposed between an outboard ramped plate and an inboard ramped plate; and
    a plurality of pins operably coupled to the inboard ramped plate to selectively engage and actuate the eLSD clutch pack.

9. The MFD assembly of claim 6, wherein the actuator assembly comprises:
    a motor with a rotatable output shaft;
    a reduction gear set operably coupled between the rotatable output shaft and the ball ramp assembly; and
    a brake configured to selectively brake the motor.

10. The MFD assembly of claim 9, wherein the eLSD clutch assembly is configured to be modulated to generate a torque between 0 Nm and 1,500 Nm.

11. The MFD assembly of claim 1, wherein the mLSD clutch assembly is configured to multiply torque by a factor of at least two.

12. The MFD assembly of claim 1, wherein the differential case defines first and second output shaft openings that are co-axially aligned along an axis of rotation of the differential case.

13. The MFD assembly of claim 12, wherein the differential gear assembly includes a first and a second side gear rotatably mounted within the differential case, the first and second side gears being co-axially aligned along the axis of rotation of the differential case, the first side gear defining the first output shaft opening configured to provide a first torque transmitting connection with a first output shaft received within the first output shaft opening, the second side gear defining the second output shaft opening configured to provide a second torque transmitting connection with a second output shaft received within the second output shaft opening.

14. The MFD assembly of claim 13, wherein the differential gear assembly further includes a plurality of pinion gears disposed between the first and second side gears and rotatably mounted to a pinion gear shaft that is fixed for rotation with the differential case.

15. A multi-function differential (MFD) assembly, comprising:

a differential case;
a differential gear assembly disposed in the differential case;
a mechanical limited slip differential (mLSD) clutch assembly disposed in the differential case; and
an electronic limited slip differential (eLSD) clutch assembly disposed in the differential case,
wherein the mLSD clutch assembly is configured to provide the MFD assembly with mLSD functionality, and the eLSD clutch assembly is configured to provide the MFD assembly with eLSD functionality,
wherein the mLSD clutch assembly is configured to multiply torque by a factor of at least two,
wherein the eLSD clutch assembly is configured to be actuated to a maximum torque of at least 3,000 Nm, which is torque multiplied by the mLSD clutch assembly to generate at least 6,000 Nm of holding torque to enable the MFD assembly to function as a locked differential.

* * * * *